United States Patent
Schmidt et al.

(10) Patent No.: US 6,938,707 B2
(45) Date of Patent: Sep. 6, 2005

(54) METHOD AND SYSTEM FOR MINIMIZING CIRCULATING FLUID RETURN LOSSES DURING DRILLING OF A WELL BORE

(75) Inventors: Joseph H. Schmidt, Galveston, TX (US); Manuel E. Gonzalez, Kingwood, TX (US); John Lofton, Woodlands, TX (US); James B. Bloys, Katy, TX (US); Gregory P. Pepin, Sugar Land, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 38 days.

(21) Appl. No.: 10/438,469

(22) Filed: May 15, 2003

(65) Prior Publication Data

US 2004/0226746 A1 Nov. 18, 2004

(51) Int. Cl.[7] .................... E21B 21/00; E21B 21/01; E21B 33/13; E21B 36/00
(52) U.S. Cl. .................... 175/17; 166/288; 166/300; 166/302; 175/64; 175/72
(58) Field of Search .................... 166/61, 288, 300, 166/302, 303; 175/11, 17, 64, 72

(56) References Cited

U.S. PATENT DOCUMENTS

| | | | |
|---|---|---|---|
| 2,812,161 A | | 11/1957 | Mayhew |
| 3,047,068 A | * | 7/1962 | Hanson ........................ 166/283 |
| 3,061,542 A | | 10/1962 | Reddie et al. |
| 3,559,737 A | * | 2/1971 | Ralstin et al. ............... 166/281 |
| 3,837,401 A | * | 9/1974 | Allen et al. .................. 166/303 |
| 3,881,551 A | | 5/1975 | Terry et al. |
| 4,003,432 A | * | 1/1977 | Paull et al. .................. 166/271 |
| 4,476,932 A | * | 10/1984 | Emery ........................ 166/303 |
| 4,501,143 A | | 2/1985 | Prior et al. |
| 4,510,800 A | * | 4/1985 | Prior ........................ 73/152.22 |
| 4,510,801 A | * | 4/1985 | Quigley et al. ........... 73/152.19 |
| 4,619,773 A | | 10/1986 | Heilweil et al. |
| 4,655,286 A | * | 4/1987 | Wood ........................ 166/285 |
| 5,348,093 A | | 9/1994 | Wood et al. |
| RE35,891 E | * | 9/1998 | Jamaluddin et al. ........ 166/302 |
| 6,214,773 B1 | * | 4/2001 | Harris et al. ................ 507/271 |
| 6,450,262 B1 | | 9/2002 | Regan |

OTHER PUBLICATIONS

Perkins, T., Gonzalez, J., Changes in Earth Stresses Around a Wellbore Caused by Radially Symmetrical Pressure and Temperature Gradients, Society of Petroleum Engineers, Inc. (SPE) 10080, 1981.

Schmidt, J., Large–Scale Injection of North Slope Drilling Cuttings, presented at the SPE/EPA Exploration and Production Environmental Conference, Austin, TX, Society of Petroleum Engineers, Inc. (SPE) 52738, 2/28 to Mar. 3, 1999.

* cited by examiner

Primary Examiner—George Suchfield
(74) Attorney, Agent, or Firm—Richard J. Schulte

(57) ABSTRACT

A method and a system for minimizing circulating fluid return losses during drilling of a well bore are disclosed. Circulating fluid, or mud, is heated above conventional temperatures for circulating fluids. The heated circulating fluid then contacts a region of a formation, in which a well bore is to be drilled, maintaining the formation at a relative higher temperature than if no special sources of heat were used to add heat to the circulating fluid. The region, at the relatively higher temperature, has a tendency to expand and to be placed in a relatively higher compressive state as compared to a formation at a lower temperature. Consequently, the use of the heated circulating fluid minimizes fracture initiation and growth and circulation fluid losses into the formation.

20 Claims, 10 Drawing Sheets

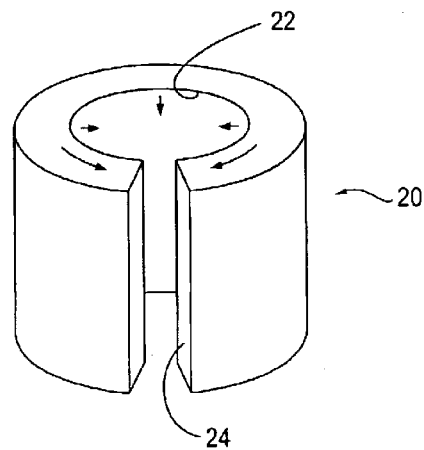
FIG. 1
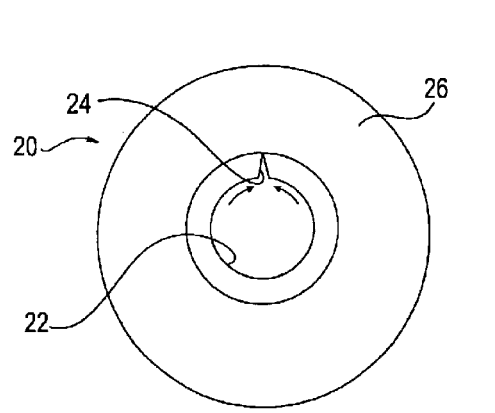     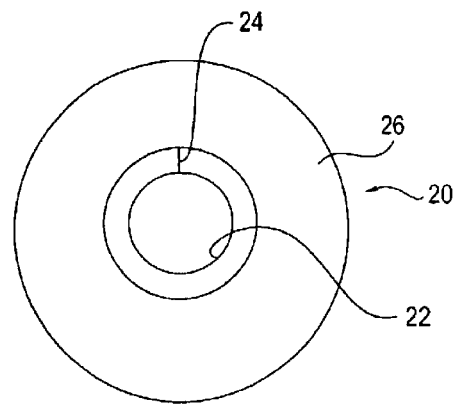
FIG. 2A           FIG. 2B

METHOD AND SYSTEM FOR MINIMIZING CIRCULATING FLUID RETURN LOSSES DURING DRILLING OF A WELL BORE

TECHNICAL FIELD

The present invention relates to methods and systems for drilling well bores in subterranean formations, and more particularly, to methods and systems which minimize the loss of circulating fluids during the drilling of well bores.

BACKGROUND OF THE INVENTION

Fractures in a hydrocarbon producing formation are sometimes beneficial to enhanced hydrocarbon production. Often, a formation is intentionally fractured by high pressure fracturing fluids to increase the conductivity of a formation to allow fluids to more readily travel through the formation to a producing well bore. It is known that the cooler the temperature of fracturing fluids, the easier it is to break down a formation.

Thomas Perkins and Jay Gonzalez published a SPE paper (SPE 10080) in October 1981, entitled *Changes in Earth Stresses Around a Wellbore Caused by Radially Symmetrical Pressure and Temperature Gradients*, wherein they cited water flooding as an example of where a large volume of cooler liquid was injected into a higher temperature in situ reservoir. It was noted that cooling can have a large effect on lateral earth stresses. And in some conditions, vertical hydraulic fracturing pressures can be significantly reduced using the cooler fracturing fluids.

In other circumstances, it is undesirable to have excessive fracturing of formations, such as when drilling a well bore utilizing circulating fluids. Circulating fluids are also commonly referred to as "mud" due to their composition and appearance. Circulating fluids serve to (1) lubricate and cool drilling bits drilling a well bore in a formation; (2) flush cuttings from a well bore up to the surface of a well; and (3) provide a pressure head which counteracts and helps control the influx of fluids from formations surrounding a well bore.

Typically, this mud is mixed in circulating tanks adjacent to the drilling rig drilling a well bore. The constituents comprising the mud are adjusted as needed to meet a variety of drilling concerns. The mud is typically not heated. An exception occurs at cold weather drilling sites where mud must not be allowed to freeze. For economic reasons, only enough heat is added to prevent the mud from freezing.

A significant problem in drilling wells is maintaining a sufficient mud weight to maintain well control. Concurrently, the weight of the mud must be sufficiently low so that the pressure head applied by the mud does not appreciably create or enhance fractures in the formation being drilled. Such fractures can lead to large losses of circulating fluids into the formation. This problem is commonly referred to as a "lost returns" problem as the circulating fluids fail to return to the surface of a well. These "lost returns" problems are particularly acute in (1) deep water wells; (2) areas with high geothermal formation temperatures; (3) steam flood operations; and (4) drilling through naturally fractured formations.

The lost circulation fluids can result in much higher drilling costs. First, the circulating fluids often include expensive components such as synthetic oil, weighting agents, emulsifiers, surfactants, and polymers which must be replenished. Second, the cost of drilling is time related. For example, it can cost as much as $400,000 a day to use a drill ship to drill a deep water well. "Lost returns" problems increase the time necessary to drill a well because of well control issues.

Prior techniques to mitigate "lost returns" problems have included reducing the weight of the mud column. For example, dual gradient drilling may be used to decrease the pressure head on the formation being drilled.

U.S. Pat. No. 6,450,262 discusses methods for mitigating lost circulating problems including the use of dual gradient drilling.

There is a need for an improved method and system for controlling lost circulation returns when drilling well bores into subterranean formations. This is particularly true for highly fractured formations, formations at great depths, and when drilling deep water wells. The present invention addresses this need by providing a method and system for mitigating circulation return losses.

SUMMARY OF THE INVENTION

The present invention includes a method for minimizing circulating fluid losses during drilling of a well bore in a subterranean formation. The method comprises heating a circulating fluid to a temperature above that used in conventional drilling operations to produce a heated circulating fluid. The heated circulating fluid is placed in contact with a region of a well bore in the subterranean formation proximate to where drilling is to occur. Ideally, the temperature of the heated circulating fluid contacting the region is at least 20° F., more preferably 40° F. and most preferably at least 60° F. above the temperature of circulating fluids used in conventional drilling techniques wherein no special heating mechanism is used to heat circulating fluids for the express purpose of minimizing loss of circulating fluids. This region of the well bore is particularly susceptible to initiation or growth of fractures which fluidly communicate with the subterranean formation. Because this region of the well bore is maintained at a relatively higher temperature than if a non-heated circulating fluid were in contact with the region, the size of and the fluid loss through the fractures in the region is minimized.

This method is ideally used when drilling a deep water well from an offshore platform or structure. The heating mechanism may be mounted on the platform or may be located at a sub sea floor. Alternatively, the circulating fluid may be heated within the well bore. The heat may be frictionally created by passing the circulating fluid through an unconventional constriction formed in one or both of the drill string and the drill bit. For example, the drill string may include one or more constricted heating pipes which have a constricted cross-section which is smaller in cross-section than the adjacent segments of drill pipe forming the drill string. The circulation fluid is then frictionally heated when passing through the constricted drill pipe prior to contacting the region susceptible to fracturing.

The heating mechanism may also take the form of an exothermic reaction. For example, encapsulated nodules containing appropriate chemicals can be introduced into circulating fluids at the surface of a well. The nodules may then burst when passing through nozzles of a drill bit or other predetermined constrictions. A resulting exothermic reaction rapidly heats the circulating fluid achieving the end result of heating the circulating fluid prior to the circulating fluid contacting a fractured formation, or a formation susceptible to fracture initiation if the temperature of the formation drops sufficiently or else is subjected to sufficient hydraulic pressure. Consequently, fracture initiation and growth should be less than if a non-heated circulating fluid were employed, as is the case with conventional drilling techniques.

The present method is particularly useful where a deep well is to be drilled. Hydrostatic pressure heads are higher with deep wells than with shallow wells and there is an increased tendency for formations to fracture and lose circulating fluids. Consequently, using the heated circulating fluids of the present invention inhibits fracture initiation and growth thereby minimizing circulating fluid losses. With the use of the present heated mud drilling method, the opportunity is afforded to employ circulating fluids with greater densities to drill deep wells without unacceptable losses of circulating fluids.

The present invention is also well suited for use in drilling deep water offshore wells. Sea water tends to cool circulating fluids, particularly during the tripping in and out of the drill string and drill bits. In this instance, the circulating fluids are not circulating and are more susceptible to cooling when left stagnant adjacent cold water often found at a sea floor. By heating circulating fluids prior to the circulating fluids contacting fracture susceptible formations, fluid losses can be minimized as compared to contacting the formation with circulating fluids chilled by conduction from cold sea water. This may be accomplished by flushing chilled circulating fluids from a well bore prior to recommencing drilling and reestablishing circulating fluid contact with a region of the formation susceptible to fracture initiation and/or growth.

The present invention also includes a drilling system for drilling a well bore in a subterranean formation with minimal circulating fluid losses. The system may include a drilling mechanism, a circulating tank and pump, and a heating mechanism. The drilling mechanism includes a drill string and drill bit for drilling a well bore in a subterranean formation. The circulating tank and pump circulate circulating fluids down the drill string and drill bit and up the well bore during drilling of the well. The heating mechanism is preferably designed to heat circulating fluids such that the temperature of the circulating fluid discharged from the drill bit is elevated at least 20° F. above unheated circulating fluid without using the heating mechanism. The heated circulating fluid thereby minimizes fluid losses through fractures in the subterranean formation proximate to where the drill bit is used to drill the well bore as compared to a system which does not heat the circulating fluid. The drilling system may further include an offshore structure used to support the drilling mechanism upon a sea floor. The heating mechanism may include a heater mounted upon the offshore structure or may be located on a sea floor.

Alternatively, the heating mechanism may simply be one or more constrictions in a drill string and drill bit which induces significant frictional heating of the circulating fluids when the circulating fluid passes therethrough. The constrictions may be in the drill string or else in the drill bit, such as in the sizing of nozzles.

It is an object of the present invention to provide a method and system to mitigate "lost returns" of circulating fluids by minimizing fracture initiation and/or growth in a formation contacted by circulating fluids by adding heat to circulating fluids to enhance the relative temperature and compressive stresses of the formation contacted by the heated circulating fluid as compared to contact with unheated circulating fluids.

It is another object to allow deeper wells to be drilled for a given weight of circulating fluids by inhibiting fracture initiation or growth in a formation being drilled thereby enhancing the depths from which hydrocarbons can be extracted from subterranean formations.

It is yet another object to reduce the cost of drilling well bores by minimizing the loss of circulating fluids during drilling.

It is yet another object to reduce the cost of drilling well bores by reducing the number of casing strings.

BRIEF DESCRIPTION OF THE DRAWINGS

These and other objects, features and advantages of the present invention will become better understood with regard to the following description, pending claims and accompanying drawings where:

FIG. 1 shows a schematic drawing of an annular rock section having a borehole and a fracture in the borehole;

FIGS. 2A and 2B are schematic drawings of the annular rock section located within a larger, constraining formation, first at a lower temperature and then at a higher temperature illustrating the closure of the fracture in the borehole at the higher temperature;

(FIG. 5B), and that for the temperature increase of 25° F., the density of mud can be increased by 1.37 pounds per gallon (ppg) without reaching hole instability failure region (FIG. 5C) and by 2.65 ppg before reaching lost return failure region (FIG. 5D);

BEST MODE(S) FOR CARRYING OUT THE INVENTION

I. Theory

Figure 3A:
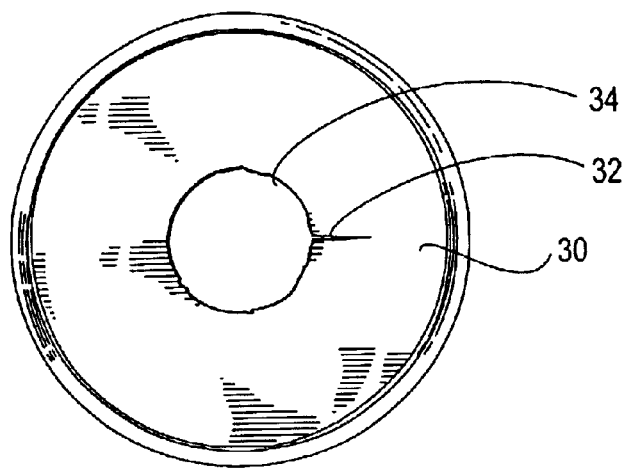
FIGS. 3A and 3B, respectively, show actual annular rubber test samples having a width of 0.10" crack at standard temperature and pressure (STP) and at an elevated temperature showing the closure of the crack.

While not wishing to be held to any particular theory, it is believed the following circumstances are often responsible for "lost returns" during the drilling of well bores. It is believed that lost return problems are aggravated when a well bore or borehole is cooled from its original state. This is particularly true in deepwater wells. For example, whenever a drill string is tripped out of and in to a well bore, the circulation of mud or circulating fluids is stopped. Consequently, the temperature of the circulating fluids contained within a riser and drill string near the sea floor may cool to approximately the sub sea temperature, which is generally less than 35° F. for a deep water well in excess of 2,000 feet deep.

When circulation is reestablished, the relatively hot formations being drilled will suddenly be exposed to the chilled circulating fluids. The temperature in the formation surrounding the well bore will drop due to the heat transfer from the formation to the much cooler circulating fluids. It is believed this will cause fractures to initiate and/or propagate from the well bore. The circulating fluids, being under a high hydrostatic pressure, may then escape into the fractures and be lost into the formation. Accordingly, more and more circulating fluids must be added to the well bore to maintain the desired control of the well bore.

It is for this reason that it is suspected that "lost returns" primarily occur, not during actual drilling, but during the initiation of circulation after tripping out and in the drill string. However, this problem is not limited to only deepwater wells. It occurs to different degrees in all wells in the oil industry.

The present invention mitigates the problem of "lost returns" by adding heat to circulating fluids contacting formations to be drilled thereby enhancing the temperature of the formation relative to using unheated circulating fluids. Because the formation is at an elevated relative temperature (in contrast to conventional drilling techniques where circulating fluids are not heated), the compressive state of the formation is believed to be enhanced which minimizes fracture initiation and growth. Furthermore, where the mud is at a temperature elevated above the surrounding formation, it is believed raising the temperature of the formation over its ambient temperature can be used to minimize or even close preexisting fractures in a formation to reduce fluid losses.

FIG. 1 shows an exemplary drawing of an annular rock section 20 having a borehole 22 and a fracture 24. Higher borehole temperatures, resulting from using heated circulating fluids, will induce the rock section 20 to expand. Since rock section 20 cannot readily expand outwardly when in an actual formation of great volume, rock section 20 preferably tries to expand radially towards the inside of borehole 22. This causes compressive hoop stress levels in the rock to increase. The higher compressive stresses will increase rock section 20's resistance to fracture.

FIGS. 2A and 2B offer an alternative way to look at the effect of elevating the relative temperature of a rock section 20 in a formation 26 surrounding a borehole 22 having an established fracture 24. This temperature effect will act to contract or close existing cracks and increase the pressure needed to open the fracture. Or in the case where a circulating fluid cools a surrounding formation, the higher the temperature of the circulating fluid, the lower the tendency for any crack or fracture to grow.

Figure 3B:
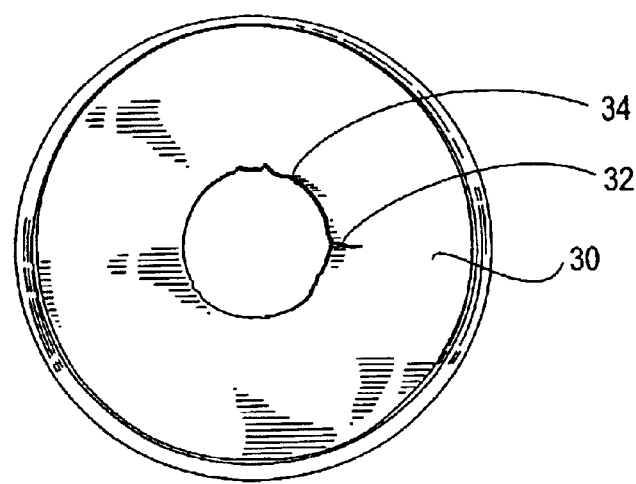

FIGS. 3A and 3B show an annular sample 30 of rubber having an initial crack 32. In FIG. 3A, an unheated simulated borehole 34, at standard temperature and pressure (STP), has an initial fracture with a width of 0.10". After elevating the temperature, crack 32 essentially closes as illustrated in FIG. 3B.

Figure 4:
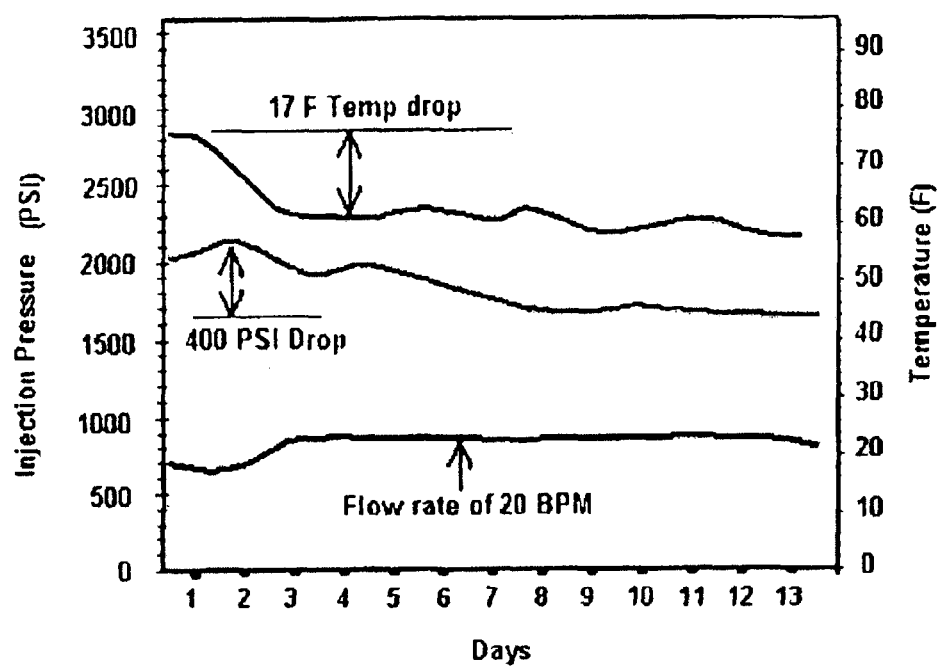
FIG. 4 shows a chart illustrating how injection pressure dropped 400 pounds per square inch (psi) on a fractured water disposal well when the temperature of drilling mud and cuttings dropped 17° F. from 78° F. to 61° F.

FIG. 4 shows a chart illustrating how the injection pressure dropped 400 pounds per square inch (psi) on a fractured disposal well when the temperature of diluted drilling mud containing drilling cuttings dropped 17° F. from 78° F. to 61° F. Further details may be found in a paper by Joseph Schmidt et al., SPE paper (SPE 52738), entitled *Large-Scale Injection of North Slope Drilling Cuttings*, which was presented at the SPE/EPA Exploration and Production Environmental Conference, Austin, Tex., 28 Feb.–3 Mar. 1999. FIG. 4 demonstrates the dependence of injection pressure on injection fluid temperature for a constant injection rate.

Figure 5A:
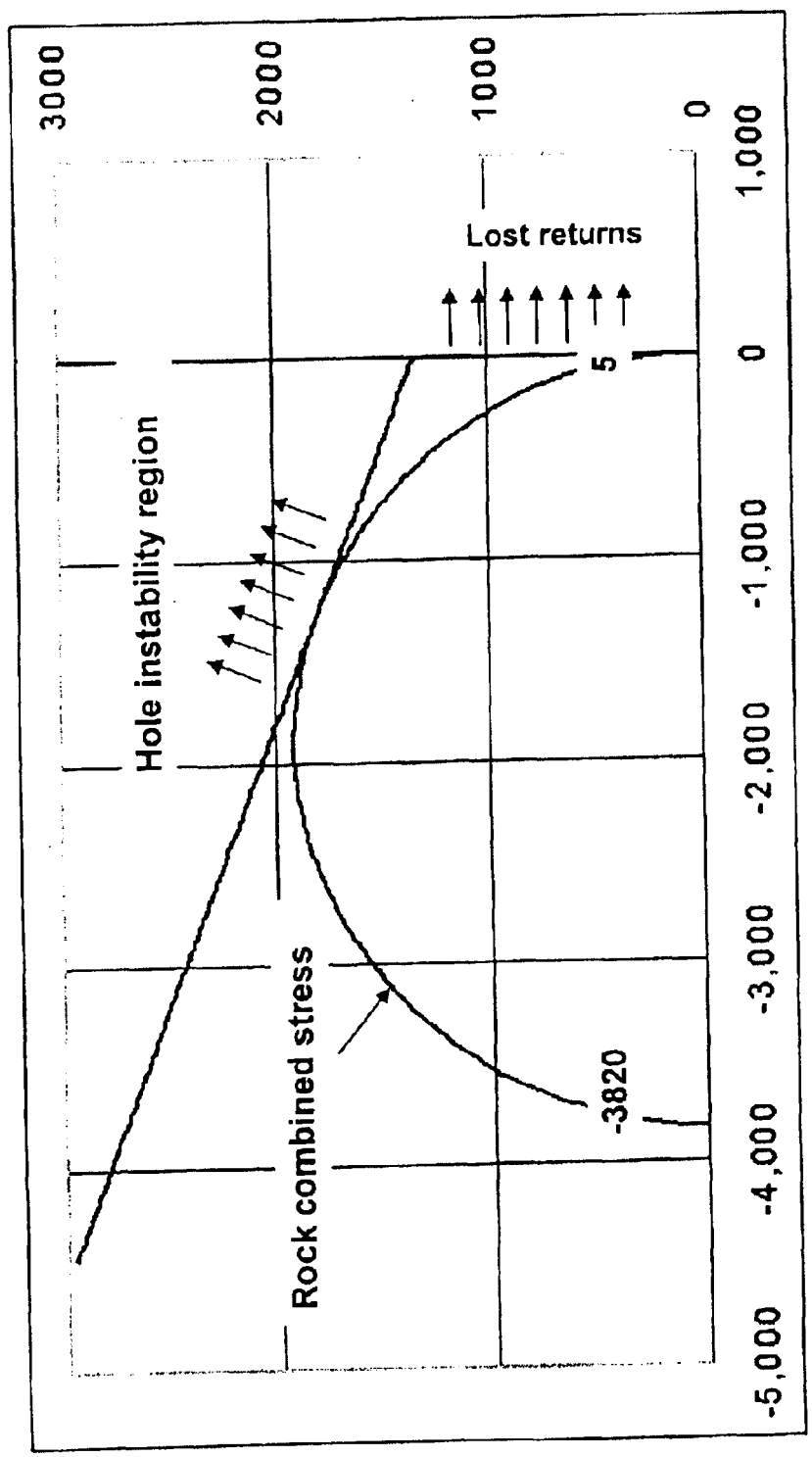
FIGS. 5A–D illustrate charts respectively showing combined rock stresses for a borehole in a rock section located at a depth of 4,500 feet at a first temperature (FIG. 5A) and at an increased temperature of 25° F.

FIG. 5A illustrates a chart showing the state of stress for a borehole surface at the point of fracture initiation in a rock section located at a depth of 4,500 feet. The horizontal axis represents principal compressive stresses while the vertical axis represents shear stresses at the borehole surface at the point of fracture initiation.

A Mohr-Coulomb failure envelope, illustrated by the straight line that obliquely intersects the vertical axis, separates stress states that result in stable well bores (below the Mohr-Coulomb failure line) and unstable well bores (above the Mohr-Coulomb failure line). The stress semicircle represents the state of stress at a point in the well bore surface that is perpendicular to the minimum in situ stress, i.e., the point of fracture initiation. The region to the right of the vertical axis represents tensile loading. The rock fails in tension forming a tensile fracture (Mode I fracture) when the combined stress semicircle is sufficiently on the tensile stress side of the vertical axis. This phenomena is represented in the figure by the region labeled lost returns. Tensile stress fractures are characterized by large leakoff. On the other hand, when the combined stress semicircle is above the Mohr-Coulomb failure envelope, the well bore fails in shear resulting in shear fractures which in general do not have the large fracture aperture of tensile fractures and do not present lost returns problems. Shear fractures can, however, result in well bore instabilities that are manifested in well bores that are out-of-gauge.

Figure 5B:
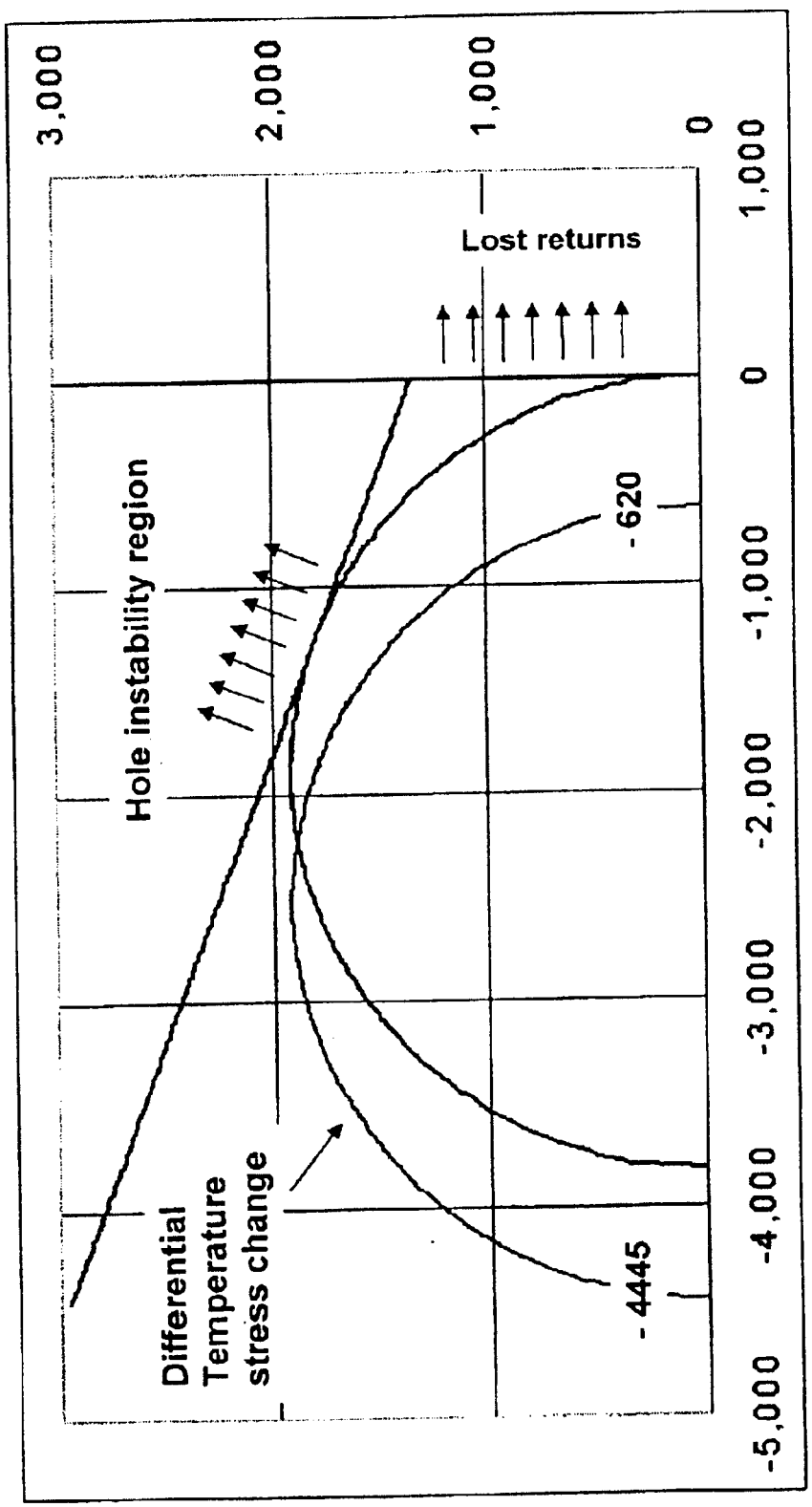

FIG. 5B shows the effect of heating the formation surrounding the borehole by 25° F. Note that combined rock stresses move away from both the hole instability region and the "lost returns" region due to the increasing formation temperature.

Figure 5C:
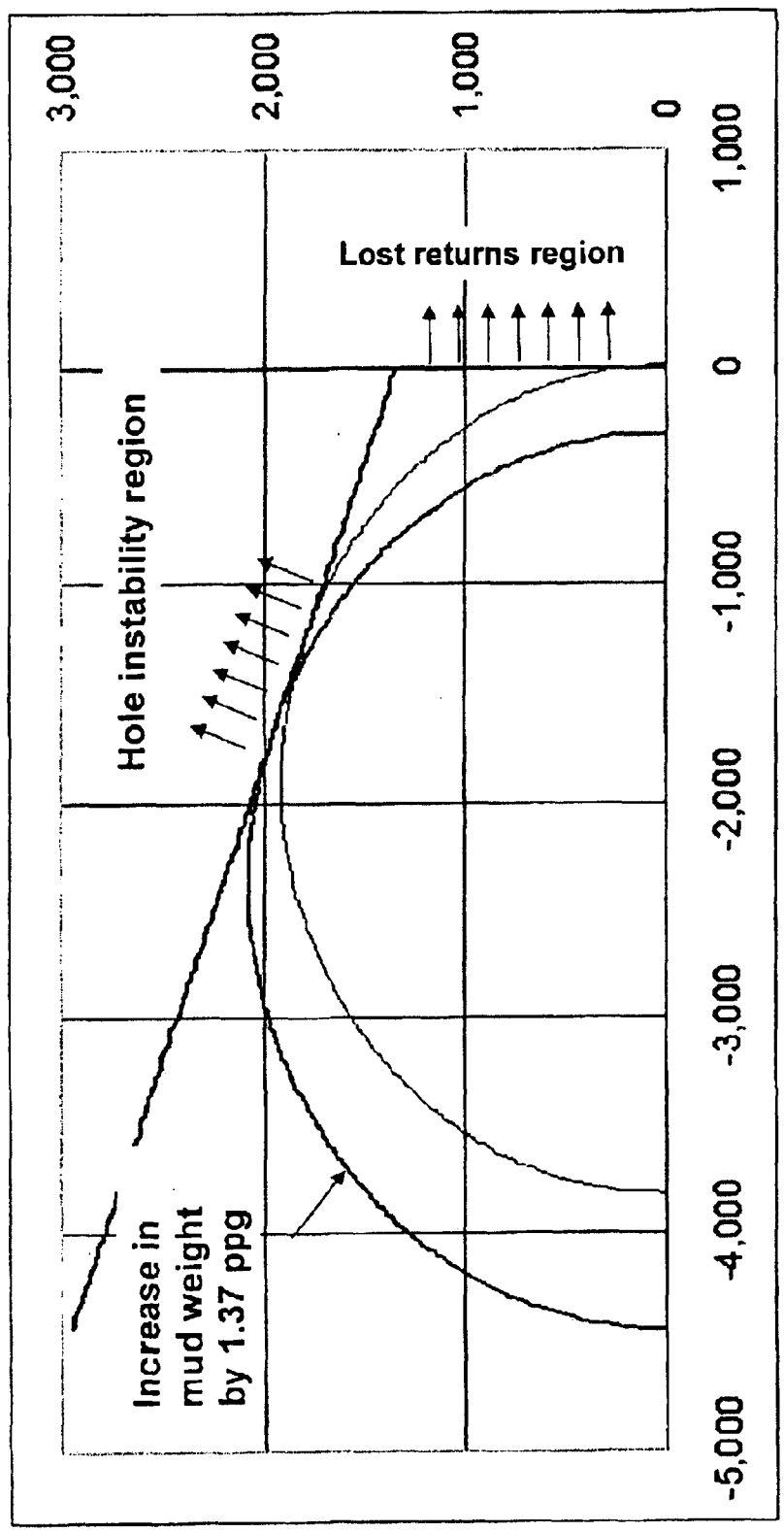
Figure 5D:
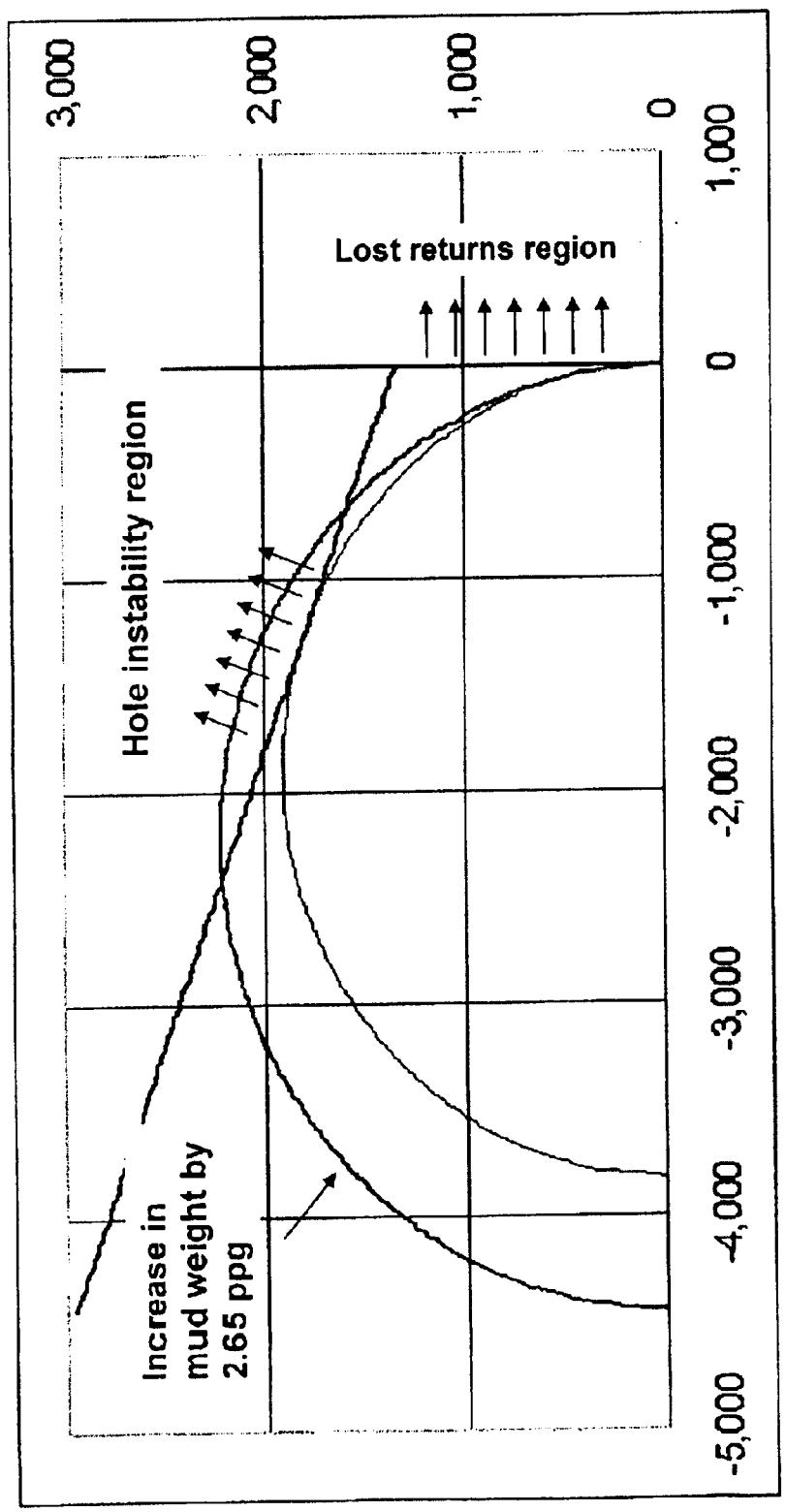

FIG. 5C shows that an increase of 1.37 ppg (pounds per gallon) of mud weight can be achieved without reaching the hole instability failure region due to the 25° F. increase in temperature in the formation. FIG. 5D illustrates that an increase of 2.65 ppg can be achieved without reaching the lost returns failure region.

II. Method and System for Minimizing Circulating Fluid Return Losses

Figure 6:
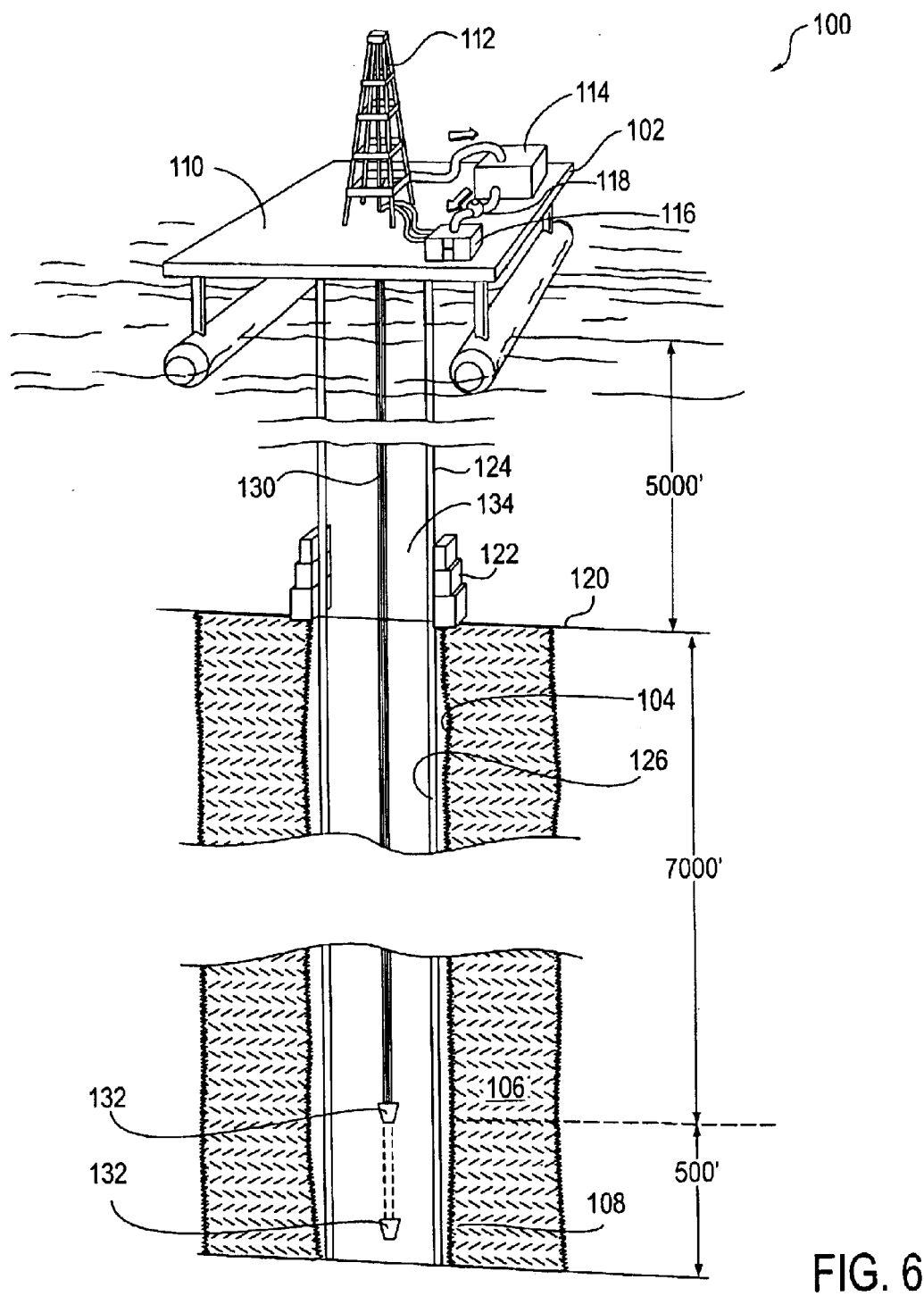
FIG. 6 is a schematic illustration of a drilling system, made in accordance with the present invention, for drilling a deep water offshore well and having a heating mechanism on an offshore platform.

FIG. 6 schematically illustrates an exemplary drilling system 100 which includes a floating deepwater offshore structure 102 to drill a well bore 104 in a sub-sea formation 106. Fracture sensitive region 108 proximate to well bore 104 is representative of a particularly weak point in the well bore susceptible to fracture initiation and growth. Structure 102 includes a platform 110 upon which a drilling apparatus 112 is positioned. A mud tank 114 is used to mix and store mud or circulating fluid which is used when drilling well bore 104. A heating mechanism, such as a heat exchanger 116, is employed to heat the circulating fluid to a desired increased temperature. For the purposes of this application, the term "heating mechanism" shall mean any device, apparatus or chemical reaction which is specifically added to a conventional drilling system for the purposes of creating a significantly temperature enhanced circulating fluid. Ideally, the circulating fluid is sufficiently heated by the heating mechanism such that the temperature of the circulating fluid is enhanced before contacting fracture sensitive region 108 of formation 106.

A pump 118 is used to circulate mud throughout system 100. Located on a sea floor 120 is a well head 122. A riser 124 extends from well head 122 up to drilling apparatus 112. Well bore 104 ideally is lined with a casing 126. A drill string 130 is suspended from and is rotatably driven by drilling apparatus 112. A drill bit 132 is used to drill well bore 104 in formation 106. Riser 124 and/or drill string 130 may be insulated to limit heat losses from the circulating fluid to the surrounding environment, i.e., the sea.

During drilling operations, mud from mud tank 114 is pumped through heat exchanger 116 prior to reaching drilling apparatus 112. The heated mud is then pumped down drill string 130 until reaching drill bit 132. The heated mud is expelled through openings or nozzles (not shown) in drill bit 132 to flush away cuttings from formation 106. The heated circulating fluid contacts region 108 when the drill bit 132 drills to the depth of 108 circulating up annulus 134 formed between drill string 130 and casing 126 and then drill string 130 and riser 124. The mud passes up casing 126, through wellhead 122, up riser 124 to drilling apparatus 112 and is returned to mud tank 114.

Ideally, the circulating fluid contacting fracture susceptible region 108 will have its temperature raised by at least 20° F., more preferably by at least 40° F., and most preferably by more than 60° F. relative to not adding heat to the circulating fluid using a heating mechanism, i.e., heat exchanger 116, in this embodiment of the invention.

Thus, region 108 in contact with the heated circulating fluid is maintained at a relatively higher temperature than if a non-heated circulating fluid were used. Region 108 is constrained or bound by the surrounding formation 106 such that the region is maintained in a relatively greater state of compressive stress than it would be at a lower temperature. The enhanced compressive state of this region inhibits the initiation and/or growth of fractures relative to what would be the case if a less compressive state were in existence.

Consequently, loss of circulating fluid through fractures in region 108 during drilling is minimized or mitigated as compared to what losses would be using a lower temperature circulating fluid.

The heated circulating fluid may be at a higher or lower temperature than region 108 of formation 106 in contact with the circulation fluid. However, by heating the circulating fluid to a higher temperature, the adjacent formation is still kept at a higher temperature and higher compressive stress state than if a non-heated circulating fluid were used. This will act to increase the formation breakdown pressure and mitigate the problems with "lost returns" of circulating fluids.

Of particular concern is the introduction of cool circulating fluids during tripping in and out of the drill string to replace broken or worn out drill bits 132 or to make other repairs or maintenance operations. During this process, circulating fluids are no longer circulated down the drill pipe 130 and returned up annulus 134 formed between drill pipe 130 and casing 126 and riser 124. Accordingly, the mud adjacent sea floor 120 may conductively cool to the temperature of the adjacent sea floor water or approximately 34° F. In contrast, the mud located in well bore 104 in contact with formation 106 will acquire heat from formation 106 and be at a significantly higher temperature than the mud residing above the sea floor and cooled by the sea water.

If circulation were started again as drilling recommenced, the slug of mud which resided within drill pipe 130 adjacent sea floor 120 would be relatively cold and would eventually reach the location where drilling is occurring. This "cold" slug of mud would significantly cool region 108 of formation 106 being drilled. Consequently, increased fracturing and fracture growth may occur at the bottom of well bore 104.

To overcome this potential problem, drill string 130 and drill bit 132 are run in until drill bit 132 is about 500 feet above the bottom of well bore 104. For the purposes of this illustration example, the depth of the sea is 5,000 feet and the depth of well bore 104 is 7,500 feet. Mud is heated by heat exchanger 116 and pumped by pump 118 down drill string 130 and out drill bit 132. As well bore 104 is closed ended, the cold slug of mud passes down through drill bit 132 and returns up the annulus without displacing the mud at the lower portion of well bore 104. Sufficient heated mud is circulated such that the cold slug of mud is eliminated from well bore 104. Subsequently, drill string 130 is lowered until drill bit 132 is in a position to drill again.

As a result, the cold slug of mud which would otherwise contact formation 106 in conventional drilling operations is avoided by circulating out the cold mud prior to recommencing drilling and further by introducing the heated mud. As the relative temperature of the formation being drilled is kept at an elevated temperature, relatively to not using heated mud, the initiation and growth of fracture is minimized. Consequently, the loss of mud through fractures into formation 106 is also limited.

Because fracture growth is inhibited by maintaining the region in contact with the circulating fluid at a higher relative temperature than when using conventional drilling techniques, the density or mud weight of circulating fluids used and/or the depth of a well bore being drilled may be increased by using the method and system of the present invention. Further, this enhancement in minimization of fluid loss during drilling can lead to well bores being drilled in less time and less expensively than using conventional drilling techniques and systems where the circulating fluid is not heated to minimize losses of circulating fluids.

Figure 7:
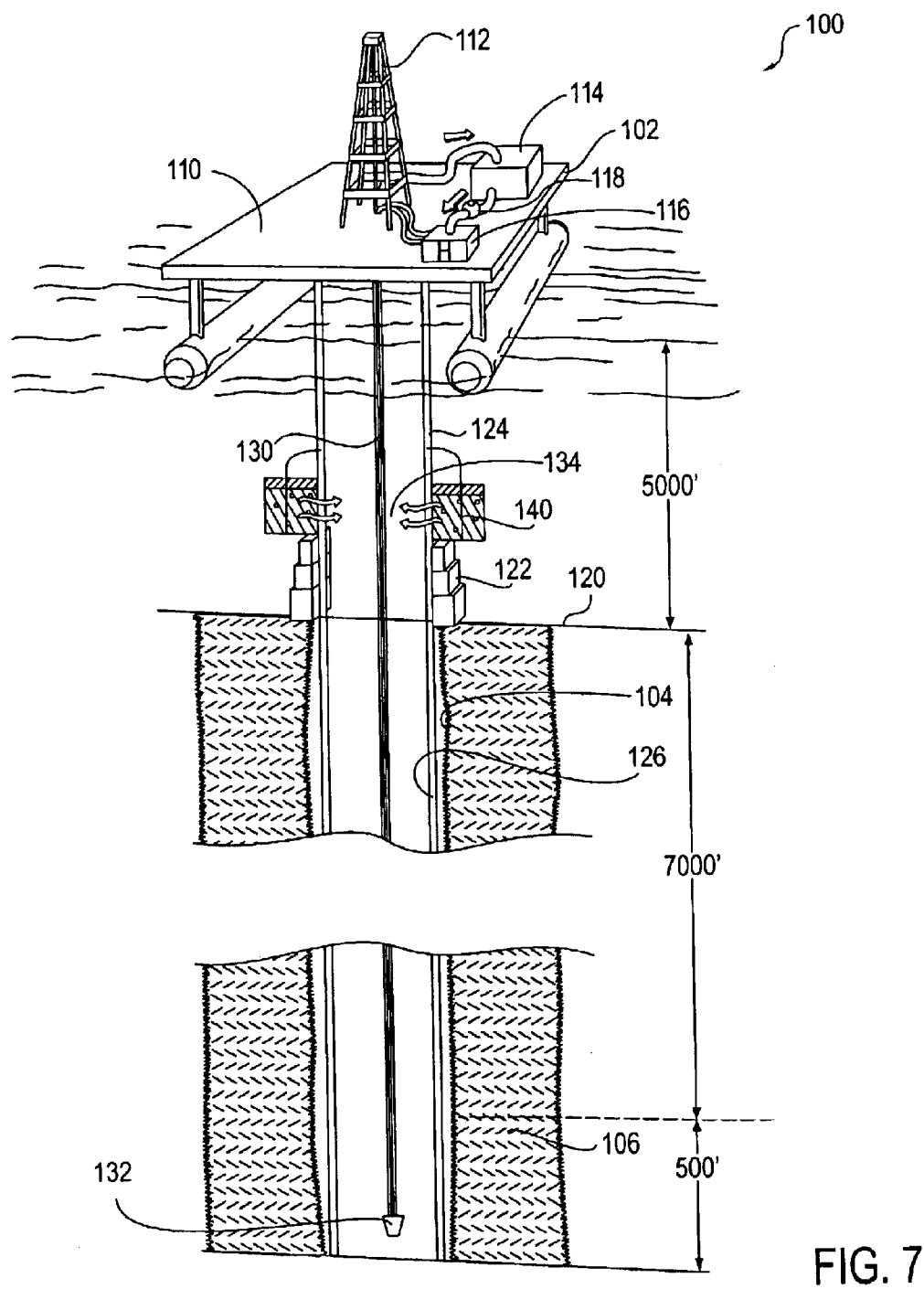
FIG. 7 is a schematic illustration of a drilling system having a heating mechanism mounted near a sea floor which conductively transfers heat to circulating fluids contained in an adjacent riser and drill pipe.

FIG. 7 shows a second embodiment wherein mud is heated by a heater 140 located on sea floor 120. Heater 140 may use electric coils (not shown), methane, etc., to produce the desired heat. Heater 140 surrounds riser 124 and provides heat to drill pipe 130 concentrically positioned in riser 124. The portion of riser 124 above heater 140 may be insulated (not shown) to minimize heat loss. Mud passing through drill pipe 130 in this region of riser 124 therefore acquires heat prior to its introduction into the portion of well bore 104 located beneath sea floor 120. The advantage to heating the mud at this point is that the mud entering casing 126 is heated and not chilled. Consequently, the cold slug of mud located in drill pipes adjacent the sea floor, particularly during tripping in and out the drill pipe and drill bit, in conventional drilling operations can be avoided. The formation being drilled is not affected by the "cold" mud cooled by the sea floor water which can enhance fracturing of the formation when the cold mud contacts the region of the formation being drilled.

Figure 8:
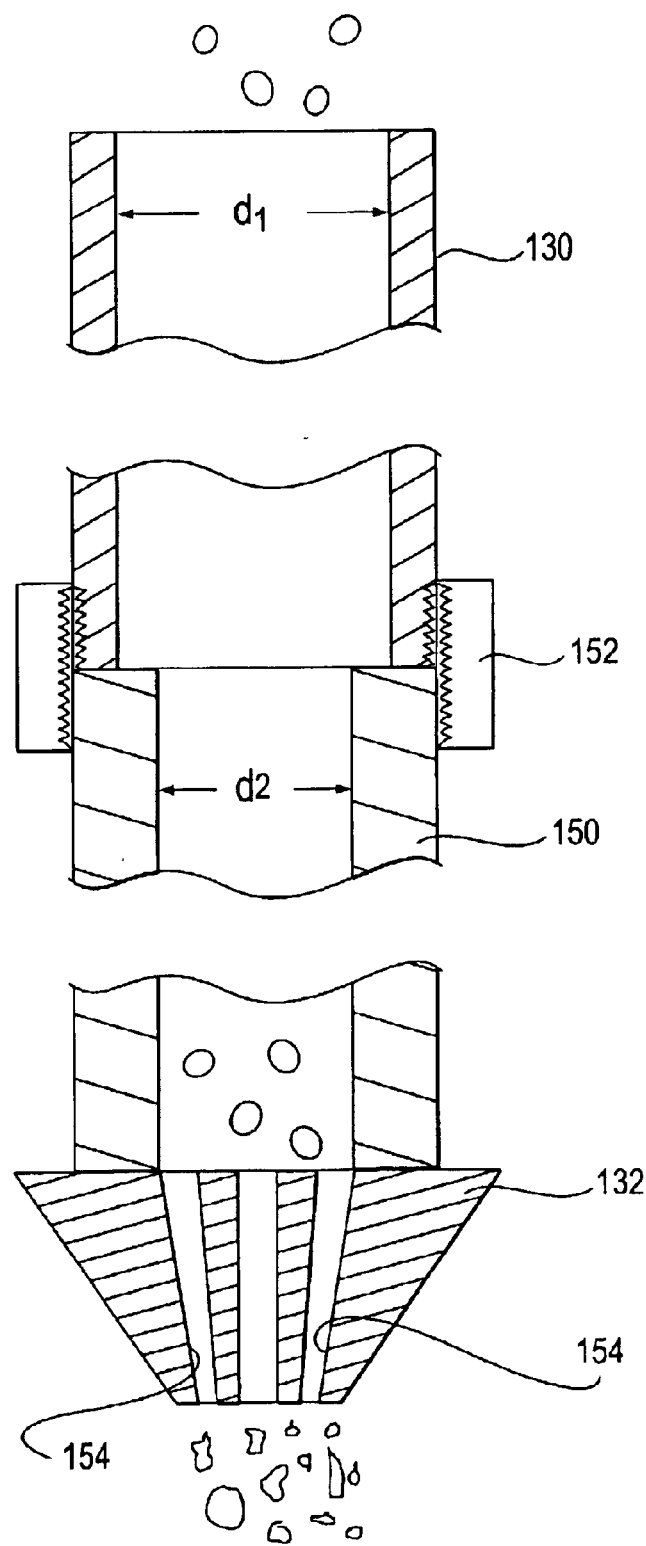
FIG. 8 is a fragmentary sectional schematic view of a drill pipe connecting to a constricted heating pipe and drill bit wherein a circulating fluid may be frictionally heated as its passes through the constricted heating pipe and with encapsulated nodules fracturing as they pass through nozzles in the drill bit.

In a third embodiment of the present invention, as shown in FIG. 8, mud is frictionally heated by passing through a constricted passageway so that a discrete mechanical heating mechanism, either on platform 102 or on sea floor 120, is not required. Ideally, the heating in the constricted passageway occurs near the location of the drilling of well bore 104.

FIG. 8 shows a constricted heating pipe or sub 150 which is placed intermediate the lower end of drill string 130 and drill bit 132. A drill collar 152 is used to join heating pipe 150 to the bottom of drill string 130. In this example, drill string 130 may have a 4" O.D. and a 3" I.D. and heating pipe 150 may have a 4" O.D. and a 2" I.D. Mud being pumped down drill string 130 is accelerated from the end of drill string 130 as it passes through constricted heating pipe 150. While mud passes at an increased velocity through heating pipe 150, the pressure upon the mud will drop. Friction created by the constriction of moving from the 3" I.D. of drill pipe 130 to the 2" I.D. of heating pipe 150 will heat the mud passing through heating pipe 150 and being expelled through drill bit 132.

Mud contacting region 108 of formation 106 during the drilling operation is heated thereby allowing region 108 to be at a relatively elevated temperature as opposed to not using such a heat inducing constricted passageway. Fractures and circulation losses of mud will be minimized. The constrictions may decrease the area of flow by more than 50%, or even 100%, or even by as much as 150% to achieve the desired heating of the circulating fluid.

The above description of using a drill pipe with a constricted inner diameter to add heat to a circulating fluid is made by way of example and not limitation. Those skilled in the art will appreciate that there are innumerable other configurations which can be used which will induce a significant frictionally heating of the circulating fluid. For example, the size of nozzles 154 on drill bit 132 can be constricted to enhance frictionally heating when the circulating fluid is passed therethrough. Other examples might include using a choke (not shown) with a variable size throat to frictionally heat mud passing through the choke.

Commercially available computer modeling of constrictions in drill strings, for example, Landmark's Wellcat program, have been undertaken to estimate the temperature increase due to circulating fluids passing through constrictions.

A fourth embodiment of the present invention utilizes a heating mechanism which relies upon creating exothermic reactions to heat the circulating fluid. As an example, encapsulated nodules carrying a chemical mixture may be introduced into mud prior to the mud entering the drilling apparatus and drill string at the well surface. For example, encapsulated beads of certain acids and encapsulated bases, or certain salts that dissolve exothermically, may be introduced into drill pipe. The encapsulated beads are then burst upon passing through drill bit 132, as illustrated in FIG. 8. An exothermic reaction then occurs near the location of formation 106 being drilled thus enhancing the relative temperature of region 108 as compared to not heating the mud using this heating mechanism, i.e., creating an exothermic reaction.

Alternatively, a separate delivery conduit may be inserted into annulus 134 formed between the drill string 130 and riser 124 and casing 126 to selectively place exothermic reaction producing chemical agents adjacent to region 108 where fracturing and circulating fluid loss is a concern.

Those skilled in the art will appreciate that other means of heating the mud which is to contact the fracture sensitive region 108 are possible and are also within the scope of this invention. These means may include, by way of example and not limitation, electromagnetic energy, microwave energy, etc.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for minimizing circulating fluid losses during drilling of a well bore in a subterranean formation, the method comprising:
   (a) heating a circulating fluid by using a heating mechanism to produce a heated drilling fluid;
   (b) placing the heated circulating fluid in contact with a region of a well bore of a subterranean formation proximate to where drilling is to occur, the region of the well bore containing fractures which fluidly communicate with the subterranean formation; and
   (c) whereby the region of the well bore is maintained at a relatively higher temperature than if a non-heated circulating fluid were in contact therewith such that the size of and the fluid loss through the fractures is minimized.

2. The method of claim 1 wherein:
   the circulating fluid is heated by at least 20° F.

3. The method of claim 1 wherein:
   the circulating fluid is heated by at least 40° F.

4. The method of claim 1 wherein:
   the circulating fluid is heated by at least 60° F.

5. The method of claim 1 wherein:
   the circulating fluid is heated on the surface of an offshore platform.

6. The method of claim 1 wherein:
   the circulating fluid is heated within the well bore.

7. The method of claim 1 wherein:
   the circulating fluid is frictionally heated by passing the circulating fluid through a constriction disposed in one of a drill string and a drill bit.

8. The method of claim 7 wherein:
   the drill string includes at least one constricted drill pipe, the at least one constricted drill pipe having a constricted cross-section which is at least 50% smaller in cross-section than an adjacent drill pipe.

9. The method of claim 1 wherein:
   the heating mechanism is an exothermic reaction occurring within the circulating fluid.

10. The method of claim 9 wherein:
    the exothermic reaction is activated by bursting encapsulated nodules including chemicals which create the exothermic reaction within a drill string.

11. The method of claim 1 wherein:
    the ambient temperature at the surface of the well bore is at least 32° F. such that the circulating fluid need not be heated to prevent freezing.

12. The method of claim 1 wherein:
    a drill string and a drill bit are used to drill the well bore beneath a sea floor in an offshore well; and
    wherein during tripping in of the drill pipe and the drill bit into the well bore, the drill bit is suspended above the bottom of the well bore and heated mud is circulated through the drill string and drill pipe to remove chilled circulating fluid, cooled by sea water, from the well bore so that chilled circulating fluid does not contact the region proximate where drilling is to occur when drilling is recommenced.

13. A system for drilling a well bore in a subterranean formation with minimal circulating fluid losses, the system comprising:
    (a) a drilling mechanism including a drill string and drill bit for drilling a well bore in a subterranean formation;
    (b) a circulating tank and pump for circulating fluids down the drill string and drill bit and up the well bore during drilling of the well; and (c) a heating mechanism capable of heating circulating fluids such that the temperature of the circulating fluid discharged from the drill bit is elevated at least 20° F. above not heating the circulating fluid with the heating mechanism;

wherein fluid losses through fractures in the subterranean formation proximate to where the drill bit is used to drill the well bore is minimized relatively to using unheated mud.

14. The drilling system of claim 13 further comprising:

an offshore structure used to support the drilling mechanism during drilling a sub sea formation.

15. The system of claim 13 wherein:

the heating mechanism includes a heater mounted upon the offshore structure.

16. The system of claim 13 wherein:

the heating mechanism includes a constriction in one of the drill string and drill bit which frictionally heats the circulating fluid.

17. The system of claim 16 wherein:

the drill string includes at least one heating pipe which contains the constriction therein which increases the temperature of the circulating fluid at least 20° F. when passing through the at least one heating pipe.

18. The system of claim 13 wherein:

the drill bit includes constricted nozzles which increase the temperature of circulating fluid passing therethrough.

19. The system of claim 13 wherein:

the drilling system is capable of drilling offshore wells having a depth of at least 10,000 feet.

20. The system of claim 13 wherein:

the heating mechanism can heat the circulating fluid by at least 40° F.

* * * * *